C. H. SWEIGLE.
ILLUMINATED NUMBER.
APPLICATION FILED AUG. 28, 1911.
1,100,160.
Patented June 16, 1914.
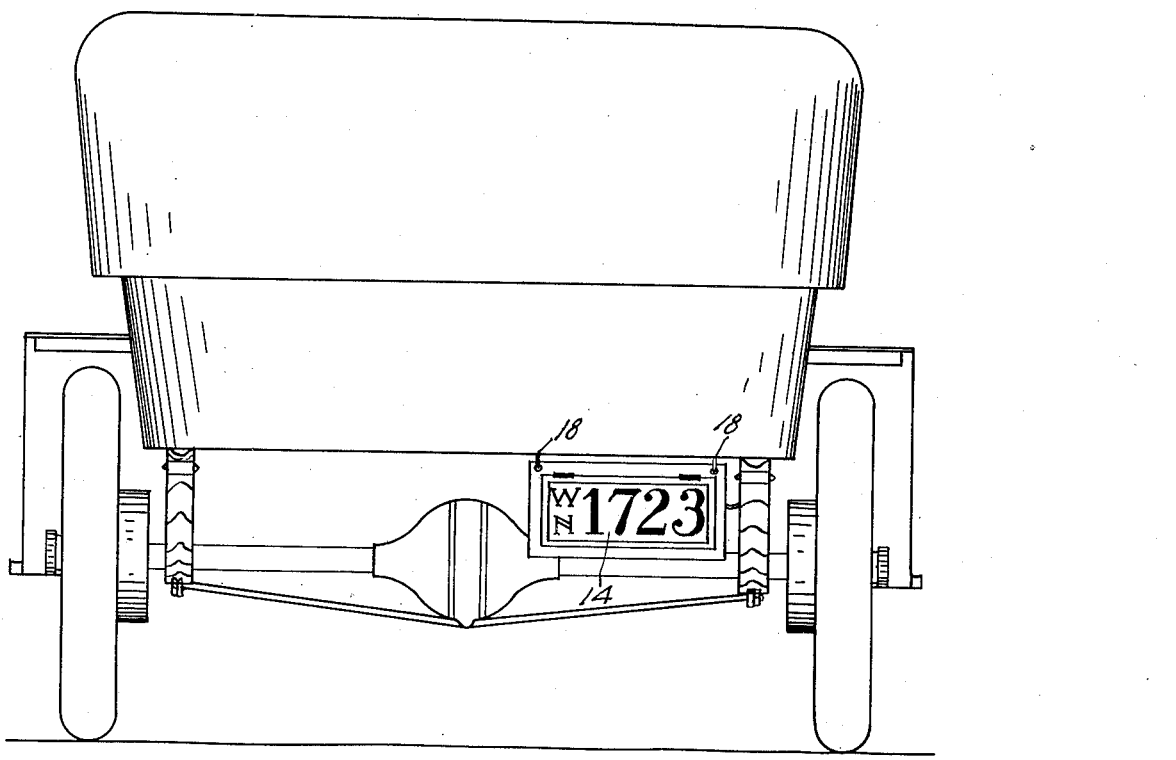
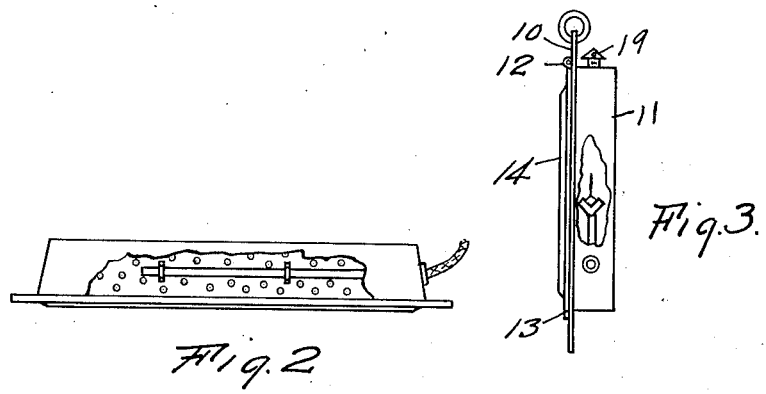
WITNESSES
H. E. Smith
Paul B Warren
INVENTOR
Charles Herman Sweigle

UNITED STATES PATENT OFFICE.

CHARLES HERMAN SWEIGLE, OF SPOKANE, WASHINGTON.

ILLUMINATED NUMBER.

1,100,160. Specification of Letters Patent. Patented June 16, 1914.

Application filed August 28, 1911. Serial No. 646,383.

*To all whom it may concern:*

Be it known that I, CHARLES H. SWEIGLE, a citizen of the United States, and residing at Spokane, in the county of Spokane and State of Washington, have invented certain new and useful Improvements in Illuminated Numbers, of which the following is a specification.

This invention relates to illuminated vehicle and house number signs, and has as its object to provide a device of this class simple in construction and arranged to prominently display the numbers.

Another object is to provide a device of this class adapted to be positioned on the rear or front of a vehicle and supported in such manner that it may swing freely when arranged upon a vehicle body.

The invention further aims to provide an illuminated sign in which the walls of the lamp-box are so relatively angularly positioned as to illuminate all portions of the transparent pane upon which the number is to be displayed or painted and to reflect the light in all directions through this pane.

Other objects will appear from the following specification, appended claims and accompanying drawings in which:—

Figure 1 is a rear view of a motor vehicle showing the device embodying the invention supported upon the rear side of the said vehicle. Fig. 2 is a top plan view partly in section of the device. Fig. 3 is a side elevation of the device with parts broken away.

Referring to the drawing the numeral 10 indicates a rectangular frame supporting a hollow metal body 11 which is rectangular in form and is secured at the forward edges of its walls to the sides of the frame 10.

A frame 13 is connected by means of hinges 12 to the top of the frame 10 and in this frame 13 is mounted a pane 14 of glass or other transparent material. It will be understood that the frame 13 may be swung outwardly upon its hinges when it is desired to clean the glass or to have access to the lamp or lamps which are arranged within the body 11, as will be presently explained.

The rear wall of the body 11 is indicated at 15 and mounted thereon are the fixtures which are provided for the lamps of the sign. Wires 16 or gas connections to a suitable source of supply extend through the walls 15 of the body 11.

When the device is to be used on an automobile or other vehicle the frame 10 is formed with openings 18 to receive a chain or strap to support the device from the body of the car. In use on such a vehicle, the device may be lighted either by electricity or gas. Wires or tubing are run from the source of supply into the body 11 of the device and are attached to the lamp or gas burners, as the case may be.

In practice where gas or similar illuminating means is used, a perforated cap or chimney 19 is positioned upon the top of the body 11 to carry off the products of combustion and to provide for ventilation. In the bottom of the body 11 openings are formed to insure passage of sufficient air into the body.

It will be observed from an inspection of the drawings that the walls of the body 11 are relatively angularly disposed in such manner that opposite walls diverge in the direction of the forward side of the body and consequently, as stated before, rays of light will be reflected in all directions through the pane of glass on which the numbers are painted.

Having thus described the invention what is claimed as new is:—

1. In a device of the class described, a flat rectangular frame provided in its upper portion with spaced openings, a suspension element engaged in each of said openings whereby the frame may be suspended, an open faced casing, said casing being secured at its forward edges to the frame, whereby its open face registers with the face inclosed by the frame, the periphery of the frame being thus extended beyond the limits of the casing, an illuminating device within the casing, a frame hingedly mounted on the first mentioned frame and arranged to close the front of the said casing, and a pane arranged within the second mentioned frame.

2. In a device of the character described, the combination of a substantially rectangular frame adapted to serve as a hanger bracket, an open faced casing secured to one face of the frame with its forward edges surrounding the opening in the frame, an illuminating device arranged within the casing, a secondary frame hinged to the first-mentioned frame on the opposite face thereof from the casing, and a glass pane carried by the secondary frame, the secondary frame forming a closure for the casing.

In testimony whereof I affix my signature in presence of two witnesses.

CHARLES HERMAN SWEIGLE.

Witnesses:
H. E. SMITH,
PAUL B. WARREN.

Copies of this patent may be obtained for five cents each, by addressing the "Commissioner of Patents, Washington, D. C."